(No Model.)
A. R. ROBB.
PIPE JOINT.
No. 245,263.  Patented Aug. 2, 1881.
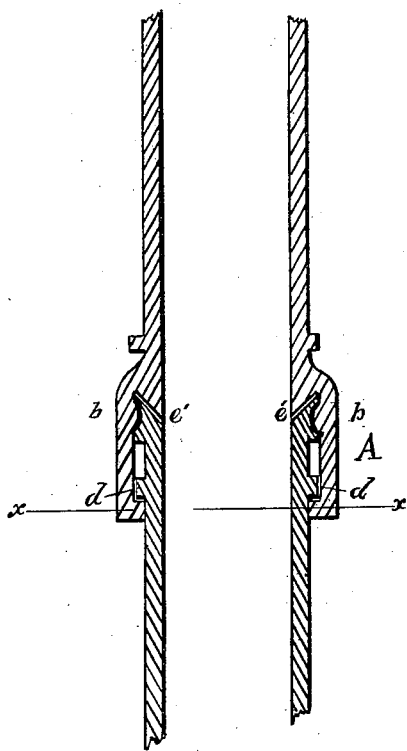
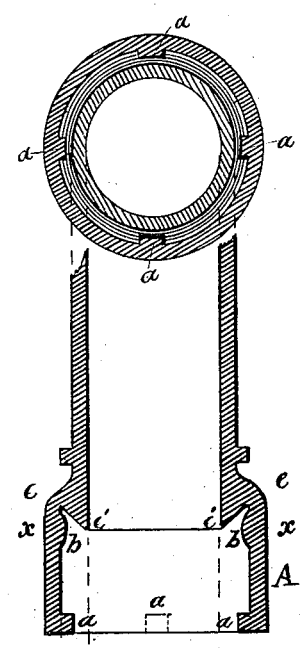
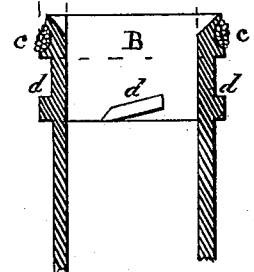
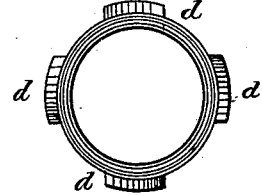
Witnesses
W. H. Singleton,
C. M. Connell
Inventor
Alexander R. Robb
Per Wm. R. Singleton
Atty.

UNITED STATES PATENT OFFICE.

ALEXANDER R. ROBB, OF BROOKLYN, NEW YORK, ASSIGNOR OF FOUR-FIFTHS TO RALPH ROBB, JAMES RALPH ROBB, JANE ELIZABETH ROBB, AND JAMES McALLEY, ALL OF SAME PLACE.

PIPE-JOINT.

SPECIFICATION forming part of Letters Patent No. 245,263, dated August 2, 1881.

Application filed May 27, 1881. (No model.)

*To all whom it may concern:*

Be it known that I, ALEXANDER R. ROBB, a citizen of Brooklyn, residing at 15 Quincy Street, in the county of Kings and State of New York, have invented certain new and useful Improvements in Water, Gas, and Sewer Pipe Joints; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to the method of joining water, gas, or sewer pipes; and it consists in providing, within the ordinary flange, for self-tightening devices, all of which will be hereinafter more fully described, and set forth in the claim.

In the drawings, Figures 1, 3, and 4 are longitudinal sections. Fig. 2 is an end view of the flange end. Fig. 5 is an end view of the small end.

A is the flange. On the inside, near the end, are small lugs $a$. In this case four are used. Any other number may be employed. At the bottom of the flange there is formed a convex projection, $b$, all around the inside. The recess below this projection $b$ is beveled at an angle of about forty-five degrees, but any angle will answer; but for permanence to earthen pipes the one shown of forty-five degrees is the best.

B is the end of the pipe which is to be inserted in the flange A. The inside of the end is beveled to the same angle (forty-five degrees) as the recess of the flange, as seen in Fig. 1, where the two pipes are represented as fitted together. On the outside of B there is a concavity, $c$, formed for the reception of elastic packing material, as shown in Fig. 4.

At $d\ d$ are four projections, longer than the projections $a\ a$ of the flange, and which are placed on the surface at a spiral line representing the thread of a screw, as seen at $d$ in Fig. 4. Were these projections to be continued entirely around the outside of the pipe, they would be four distinct threads. The space between them is left so that the end B may be entered into flange A, and by giving the pipes or either of them a sufficient turn the lugs $a\ a$ will pass above the spiral lugs $b\ b$ and force the packing at $c$ to be compressed against the convex projecting surface $b$, and thus make a tight joint. The function of the beveled recess at $e\ e$, fitting, as it does, over the corresponding flared surface $e'$ in the end B, is to steady the end B and make a stiff joint; and, if found necessary in certain cases, an elastic ring may be inserted between the two, and by the compression of the packing make a tighter joint.

I claim—

In a pipe-coupling, the combination of the socket A, having at its shoulder a convex projection, $b$, and at its end lugs $a\ a\ a$, with the entering pipe B, having a packing-ring, $c$, and spirally-arranged projections $d\ d\ d$, substantially as and for the purpose described.

In testimony whereof I have affixed my signature in presence of two witnesses.

ALEXANDER R. ROBB.

Witnesses:
CHARLES H. WILDER,
JOSEPH F. GREEN.